United States Patent [19]

Bar-Chaim et al.

[11] 4,149,073
[45] Apr. 10, 1979

[54] SYSTEM AND METHOD FOR THE REAL-TIME CONVERSION OF TWO-COLOR INCOHERENT OR COHERENT LIGHT TO TWO-COLOR COHERENT LIGHT

[75] Inventors: Nadav Bar-Chaim, Natanya; Ady Seidman, Tel Aviv; Eliezer Wiener-Avnear, Beersheba, all of Israel

[73] Assignees: Ramot University Authority for Applied Research & Industrial Development Ltd., Neveh Avivim; Ben Gurion University of the Negev, Research & Development Authority, Beersheba, both of Israel

[21] Appl. No.: 827,013

[22] Filed: Aug. 23, 1977

[30] Foreign Application Priority Data

Aug. 24, 1976 [IL] Israel ............................. 50341

[51] Int. Cl.$^2$ .............................................. G01J 1/20
[52] U.S. Cl. .................................. 250/201; 250/226; 350/356
[58] Field of Search ................ 250/201, 226; 350/150, 350/157, 158, 355, 356

[56] References Cited

U.S. PATENT DOCUMENTS 3,791,717   2/1974   Honda ........................ 350/356 X Primary Examiner—James B. Mullins
Attorney, Agent, or Firm—Benjamin J. Barish

[57] ABSTRACT

A system and method are described for the real-time conversion of a two-color optical input into coherent light of two colors. The system includes a first electrooptic device oriented to receive the optical input, the device having applied thereto a periodic voltage producing an electrical field periodically varying between magnitudes effective to block one or the other color of the optical input. The system further includes a second electrooptic device oriented to produce coherent light of two colors, this device having applied thereto a second periodic voltage in synchronization with the first-mentioned voltage to produce an electrical field periodically varying between magnitudes effective to block one or the other color of the coherent light source. A gate applies the second periodic voltage to the second electrooptic device only when light of either of the two colors is outputted by the first electrooptic device.

14 Claims, 5 Drawing Figures

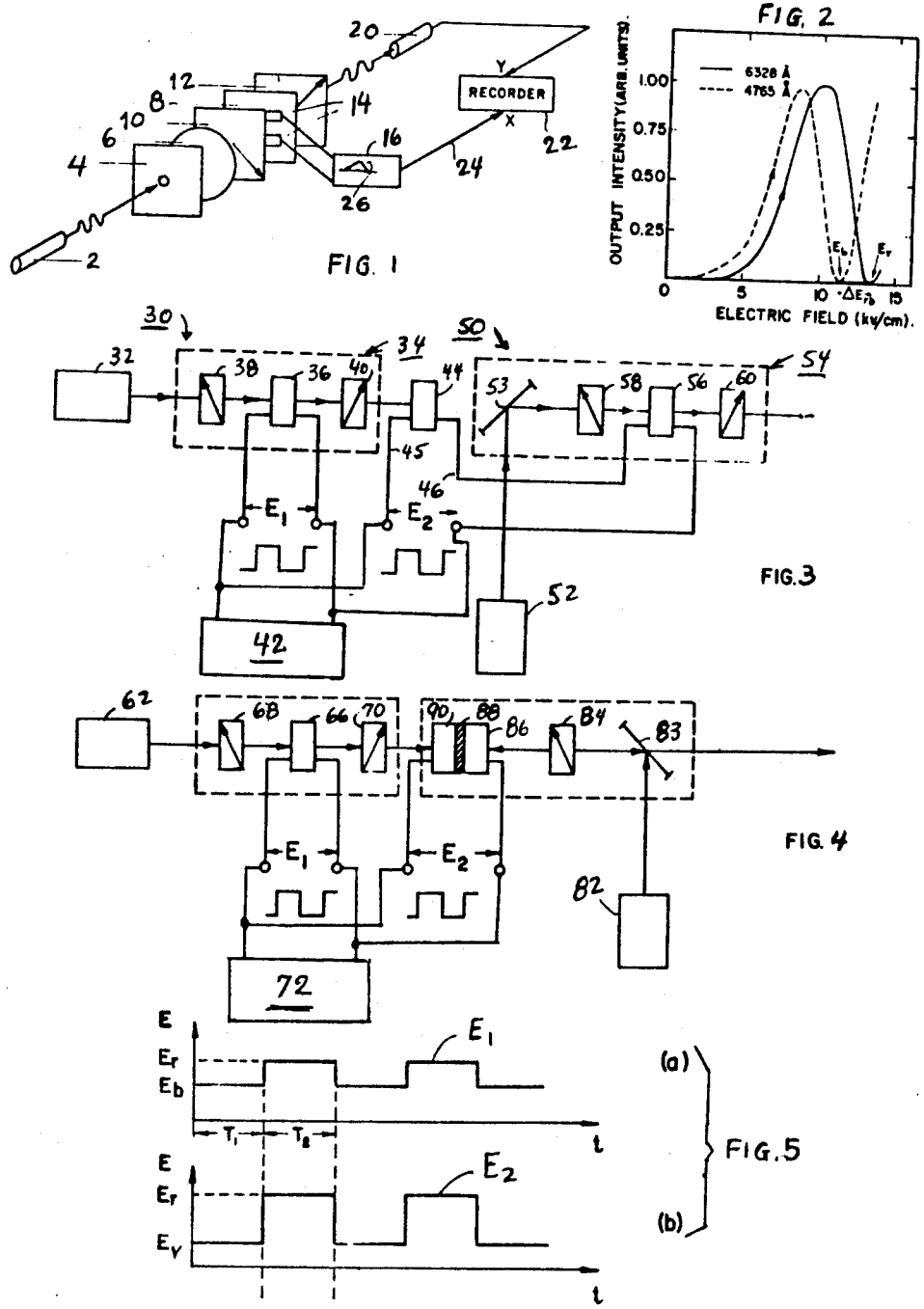

SYSTEM AND METHOD FOR THE REAL-TIME CONVERSION OF TWO-COLOR INCOHERENT OR COHERENT LIGHT TO TWO-COLOR COHERENT LIGHT

BACKGROUND OF THE INVENTION

The present invention relates to a system and method for the real-time conversion of two-color incoherent or coherent light to two-color coherent light. More particularly, the invention may be used for converting, in real-time two-color incoherent light to coherent light, or two-color coherent light into coherent light of different colors.

There are many applications, for example in optical data processing systems, wherein it is necessary to convert incoherent light to coherent light. This can easily be done in a real-time manner when only one color is involved; but where two colors are involved, the conversion is generally effected in non-real-time manner, for example by preparing a photographic print of the image and then projecting coherent light through it.

There are also applications wherein it is desirable to convert coherent light of one or two colors into coherent light of a different color or colors. An example of such an application would be a convert invisible (e.g., infrared) light to visible (e.g., red) light.

SUMMARY OF THE INVENTION

The present invention provides a system and method for effecting either of the above two conversions in a real-time manner.

According to one aspect of the invention, there is provided a system for the real-time conversion of an optical input having two colors into coherent light of two colors. The system comprises a first electrooptic device oriented to receive the optical input and effective to block or pass light therefrom in accordance with the magnitude of an electrical field applied thereto; means for applying to the first electrooptic device a first periodic voltage varying between two levels for producing a first electrical field periodically varying between one magnitude effective to block one color of the optical input and a second magnitude effective to block the other color of the optical input; a source of coherent light of two colors; and a second electrooptic device oriented to receive light from the coherent light source and effective to block or pass light therefrom in accordance with the magnitude of an electrical field applied thereto. The system further includes means for producing a second periodic voltage in synchronization with the first periodic voltage and varying between two levels for application to the second electrooptic device to produce a second electrical field periodically varying between one magnitude effective to block one color of the coherent light source and a second magnitude effective to block the other color of the coherent light source. Further included is a photoconductor switch receiving the light outputted from the first electrooptic device and effective, when light of either of said colors is received thereby, to gate the application of the second periodic voltage to the second electrooptic device.

In one application, the optical input is of incoherent light, whereby the system operates as a two-color incoherent-to-coherent light converter.

In a second possible application, the optical input is of coherent light at least one color of which is different from those of said coherent light source, whereby the system operates as a coherent-light color converter.

Preferably, the first and second electrooptic devices each includes an electrooptic ceramic having electrodes for applying the electric field thereto, and polarizer means on the input and output sides of the ceramic.

Particularly good results have been obtained by using PLZT slip-loop forroelectric ceramics as the electrooptic devices.

The invention also provides a method for the real-time conversion of an optical input having two colors into coherent light of two colors.

BRIEF DESCRIPTION OF THE DRAWINGS

The invention is herein described, by way of example only, with reference to the accompanying drawings, wherein:

FIGS. 1 and 2 are diagrams helpful in explaining the operation of the electrooptic devices used in the present invention;

FIG. 3 is a block diagram illustrating one system constructed in accordance with the invention, this system operating in the transmission mode;

FIG. 4 illustrates another system constructed in accordance with the invention, this system operating in the reflection mode; and FIG. 5 illustrates wave-forms helpful in understanding different applications of the invention.

DESCRIPTION OF THE PREFERRED EMBODIMENT

As indicated earlier, particularly good results have been obtained when the converter utilises PLZT slim-loop ferroelectric ceramics as the electrooptic devices. Briefly, a typical cell of the converter consists of two stages: a color selector, and a display unit. The set up of the cell includes two pairs of crossed (or parallel) polarizers the PLZT ceramic plates, a photoconductive switch, a two color coherent light source, and a power supply (dc or pulsed). By applying an external electric field, a birefringent mode is induced in each stage, and the phase velocity of the optical radiation becomes field dependent. An intensity modulation is obtained by an interference of two phase modulated normal modes. The modulaton of the readout light intensity, $1_{out}(E,\lambda)$, is given by:

$$I_{out}(E_1\lambda) = I_s(E_1\lambda) + [I_{in} T(\lambda) - I_s(E_1\lambda)] \sin^2\left[\frac{k\Gamma(E_1\lambda)}{\lambda}\right]$$

where $1_s(E,\lambda)$ is the scattered light intensity, $T(\lambda)$ is the system transmission; $I_{in}$ is the incident light intensity; and $\Gamma(E,\lambda)$ is the retardation. By the appropriate choice of two working points on the $I_{out}$- E curve with field magnitudes $E_1$ and $E_2$ satisfying the equations:

$$\Gamma(E_{\lambda 1},\lambda_1) = m_1\lambda_1$$

$$\Gamma(E_{\lambda 2},\lambda_2) = m_2\lambda_2$$

where $m_1$ and $m_2$ are integers, a color distinction is achieved. The synchronized electric fields enables the display unit to transmit only $\lambda_1$ (or $\lambda_2$) coherent light when the same color is incident on the color selector.

The foregoing will be better understood from FIGS. 1 and 2, illustrating the above properties of electrooptic devices in general, and the PLZT slim-loop ferroelectric ceramics in particular. FIG. 1 illustrates a laboratory setup which may be used to demonstrate the properties of such devices, and FIG. 2 is a curve diagram illustrating the results produced.

Thus, as shown in FIG. 1, a light source 2 is oriented to project light via an aperture 4 and collimator 6 to an electrooptic device including the ferroelectric ceramic 8 having a polarizer 10 on its input side and a crossed second polarizer 12 on its output side. The ceramic 8 is provided with electrodes 14 producing an electrical field transverse to the path of the light source 2, electrodes 14 being supplied by a voltage from power source 16. The light output of ceramic 8 exiting through the output polarizer 12 is directed to a photometer 20 whose output is applied to recorder 22, the recorder also being controlled from power supply 16 via line 24.

In the described example, the light source 2 is of coherent laser light of two colors, red (6328 A) and blue (4765 A); and the ferroelectric ceramic 8 is PLZT 9-65/35. FIG. 2 illustrates the output intensity produced, as measured by photometer 20 and recorded in recorder 22, when the voltage from the power supply 16 applied to the electrodes 14 on the ceramic is caused to vary, as shown by curve 26, to vary the electrical field applied to the ceramic.

As shown in FIG. 2, the output intensity of each of the two colors varies with an increase in the electric field according to a sine-squared wave but the waves for the two colors are out of phase. The important points on the two curves are point $E_b$ (about 10.8 kv/cm) where the transmission of the blue light is blocked thereby producing an output of only red light; and point $E_r$ (about 13.1 kv/cm) where the red light is blocked thereby producing an output of only blue light.

FIG. 3 illustrates the setup of a typical cell operating in the transmission mode. This cell includes a first or color-selector unit 30 having an inchoherent light source 32 of two colors, and an electrooptic device, generally designated 34, having a ferroelectric ceramic 36, a polarizer 38 on its input side, and a polarizer 40 on its output side. A power supply 42 applies a first periodic voltage $E_1$ between the electrodes on the ceramic 36 to produce an electrical field transverse to the path of the light from source 32. Voltage $E_1$ is a periodic voltage varying between two voltage levels $E_r$, $E_b$, (FIG. 5a) which correspond to the voltages illustrated in FIG. 2; that is, $E_b$ equal 10.8 kv/cm and $E_r$ equal 13.1 kv/cm. Thus, when the voltage level is $E_b$, the blue color component of the input light source 32 is blocked, so that the electrooptic device 34 outputs only red light; and when voltage $E_1$ is at the $E_r$ level, the red component is blocked so that the device outputs only the blue component. The output is transmitted to a photoconductor switch 44 which shorts its input line 45 to its output line 46 whenever it is impinged by either red or blue light; at all other times, the photoconductor switch 44 presents an open circuit between lines 45 and 46.

The second or display unit 50 includes a source of coherent light 52 composed of two colors, a mirror 53 and a second electrooptic device 54 including a second ferroelectric ceramic 56 having a polarizer 58 on its input side and a second polarizer 60 on its output side. The ferroelectric ceramic 56 is subjected to an electrical field produced by a second periodic voltage $E_2$ which varies in synchronization with periodic voltage $E_1$ between the same two levels. Thus, the voltage $E_2$ may be taken from the same source 42 as voltage $E_1$, as illustrated in FIG. 3. Voltage $E_2$ is applied through the photoconductor switch 40, which as described above, shorts its lines 45, 46 whenever the photoconductor is impinged by either red or blue light from the incoherent input source 32. The photoconductor thus gates the electrooptic device 54 to produce an output only upon the occurrence of red or blue color light in the input source 32.

It will be seen from the above description that, by virtue of photoconductor 44, the electrooptic device 54 produces a coherent light output from the coherent light source 52 only when red or blue light is present in the incoherent input source 32; and that, by virtue of periodic voltage $E_2$ being synchronized with $E_1$, the coherent light output from device 54 is red when the incoherent input light is red, and is blue when the incoherent input light is blue.

This, the system of FIG. 1 effectively converts, in a real-time manner, the two-color incoherent light from input 32 to coherent light of the same two colors.

FIG. 4 illustrates a similar arrangement as FIG. 2 but operating in the reflection mode. The first or color selector unit of the setup in FIG. 4 is substantially the same as in FIG. 3, including an incoherent light source 62; a ferroelectric crystal 66 having a polarizer 68 on its input side and a crossed polarizer 70 on its ouput side; and a power supply 72 for applying a periodic voltage $E_1$ to the ferrolectric ceramic 66 for producing the electrical field periodically blocking one and then the other color.

In the second or display unit, the two-color coherent light source 82 projects its light against a beam splitter 83 which reflects the light through a polarizer 84 to the second ferroelectric ceramic 86. A dielectric mirror 88 on the opposite face of ceramic 86 reflects the light back through the ceramic, polarizer 84 and beam-splitter 82. The photoconductor 90 in the setup of FIG. 4 is disposed on the side of reflector 88 opposite to the ceramic, and acts as a switch to gate the second periodic voltage $E_2$ supplied from power supply 72 to ferroelectric ceramic 86, so that only when the two specified colors (red and blue) are in the input incoherent light source 62, is the ferroelectric ceramic 86 gated to output light from the coherent light source 82. As described above in connection with FIG. 3, since voltage $E_2$ is synchronized with voltage $E_1$ and varies between the same two levels, ceramic 86 produces a blue color output only when a blue color is present in the input, and a red color output only when a red color is present in the input.

FIG. 5 illustrates how the arrangement of FIGS. 3 or 4 may also be used for color conversion. In this application, voltage $E_1$ applied to the first stage varies between the two levels $E_r$, $E_b$ as described above, but voltage $E_2$ applied in the second stage varies between the two levels $E_r$, $E_v$, the latter being the voltage to block the transmission of violet. Thus, when the input unit blocks red, the same will occur in the output unit; but when the input unit blocks blue, the output unit will block violet. The coherent light source in the output unit would have the two colors red and violet (instead of blue), and would produce a two-color coherent output of red and violet from the two-color input of red and blue.

The higher the frequency of the periodic voltages $E_1$, $E_2$, the shorter is the lag between the output and input, and therefore the closer to a real-time basis will the system operate. This frequency is limited by the switching time of the ferroelectric ceramic and of the photoconductor. The switching time of the above-mentioned ceramic is about 1 micro-second, but that of the photoconductors is slower. A pulse repetition frequency of about 1 KHz, and up to about 100 KHz, is therefore practical.

The above-described systems have been found to provide a good distinction ratio between the colors, and good resolution of the material. In addition, a matrix configuration of cells, each according to the system of FIG. 3 for example, may be provided to produce an incoherent-to-coherent image conversion in two colors. Further, whereas a transversal mode of operation has been described, the invention can be embodied in a system operating according to the longitudinal mode, wherein the electrodes are transparent electrically-conductive coatings on the opposite sides of the ceramic.

Many other variations, modifications and applications of the invention may be made.

What is claimed is:

1. A system for the real-time conversion of an optical input having two colors into coherent light of two colors, comprising:
    a first electrooptic device oriented to receive said optical input and effective to block or pass light therefrom in accordance with the magnitude of an electrical field applied thereto;
    means for applying to said first electrooptic device a first periodic voltage varying between two levels for producing a first electrical field periodically varying between one magnitude effective to block one colour of the optical input and a second magnitude effective to block the other colour of the optical input;
    a source of coherent light of two colors;
    a second electrooptic device oriented to receive light from said coherent light source and effective to block or pass light therefrom in accordance with the magnitude of an electrical field applied thereto;
    means for producing a second periodic voltage in synchronization with the first periodic voltage and varying between two levels for application to the second electrooptic device to produce a second electrical field periodically varying between one magnitude effective to block one color of the coherent light source and a second magnitude effective to block the other color of the coherent light source;
    and a photoconductor switch receiving the light outputted from said first electrooptic device and effective, when light of either of said colors is received thereby, to gate the application of said second periodic voltage to the second electrooptic device.

2. A system according to claim 1, wherein said optical input is of incoherent light, whereby the system operates as a two-color incoherent-to-coherent light converter.

3. A system according to claim 1, wherein said optical input is of coherent light at least one color of which is different from those of said coherent light source, whereby the system operates as a coherent-light color converter.

4. A system according to claim 1, wherein each of said first and second electrooptic devices includes an electrooptic ceramic having electrodes for applying the electric field thereto, and polarizer means on the input and output sides of the ceramic.

5. A system according to claim 4, wherein said electrooptic ceramic is a PLZT slip loop farroelectric ceramic.

6. A system according to claim 4, wherein said second electrooptic device operates in the transmission mode and includes separate polarizers on its opposite sides.

7. A system according to claim 4, wherein said second electrooptic device operates in the reflection mode and includes a polarizer on one side and a mirror on the opposite side.

8. A system according to claim 7 wherein said mirror is sandwiched between the photoconductor switch and the electrooptic ceramic.

9. A system according to claim 7, further including a beam-splitter between said polarizer and said coherent light source.

10. A system according to claim 4, wherein said electrodes are disposed to produce an electrical field transversely to the direction of the optical input.

11. A system according to claim 4, wherein said electrodes are disposed to produce an electrical field longitudinally of the direction of the optical input.

12. Apparatus for the real-time conversion of an image of two colors into coherent light of two colors comprising a system according to claim 11, wherein the ceramic of the second electrooptic device includes the photoconductor switch on the surface facing the first electrooptic device, and transparent electrodes on its two outer faces.

13. A method for the real-time conversion of an optical input having two colors into coherent light of two colors, comprising the steps:
    orienting a first electrooptic device to receive said optical input, said device being effective to block or pass light in accordance with the magnitude of an electrical field applied thereto;
    applying to said first electrooptic device a first periodic voltage varying between two levels for producing a first electrical field periodically varying between one magnitude effective to block one color of the optical input and a second magnitude effective to block the other color of the optical input;
    transmitting coherent light of two colors to a second electrooptic device effective to block or pass light in accordance with the magnitude of an electrical field applied thereto;
    producing a second periodic voltage in synchronization with the first periodic voltage and varying between two levels for application to the second electrooptic device to produce a second electrical field periodically varying between one magnitude effective to block one color of the coherent light source and a second magnitude effective to block the other color of the coherent light source;
    and gating the application of said second periodic voltage to the second electrooptic device only when light of either of said colors is outputted by the first electrooptic device.

14. The method according to claim 13, wherein each of said first and second electrooptic devices includes an electrooptic ceramic having electrodes for applying the electric field thereto, and polarizer means on the input and output sides of the ceramic.

* * * * *